(12) United States Patent
Jaunasse

(10) Patent No.: US 11,046,253 B2
(45) Date of Patent: Jun. 29, 2021

(54) STORAGE BIN FOR ASSEMBLY ON A MOTOR VEHICLE BODY STRUCTURE

(71) Applicant: Nissan Motor Co., Ltd., Kanagawa (JP)

(72) Inventor: Philippe Jaunasse, Paris (FR)

(73) Assignee: Nissan Motor Co., Ltd., Kanagawa (JP)

( * ) Notice: Subject to any disclaimer, the term of this patent is extended or adjusted under 35 U.S.C. 154(b) by 96 days.

(21) Appl. No.: 16/614,115

(22) PCT Filed: May 17, 2018

(86) PCT No.: PCT/FR2018/051183
§ 371 (c)(1),
(2) Date: Nov. 15, 2019

(87) PCT Pub. No.: WO2018/211219
PCT Pub. Date: Nov. 22, 2018

(65) Prior Publication Data
US 2021/0155162 A1    May 27, 2021

(30) Foreign Application Priority Data
May 18, 2017    (FR) ...................................... 1754384

(51) Int. Cl.
*B60R 5/04*    (2006.01)

(52) U.S. Cl.
CPC ...................................... *B60R 5/04* (2013.01)

(58) Field of Classification Search
CPC ............................... B60R 5/04; B62D 25/2054

USPC ........................................................ 296/37.1
See application file for complete search history.

(56) References Cited

U.S. PATENT DOCUMENTS

| | | | | |
|---|---|---|---|---|
| 4,305,695 A | * | 12/1981 | Zachrich | B60P 1/00 296/37.1 |
| 4,789,195 A | * | 12/1988 | Fletcher | B60R 11/06 224/404 |
| 5,967,392 A | * | 10/1999 | Niemi | B60R 9/00 16/289 |
| 6,508,499 B1 | * | 1/2003 | Guanzon | B60R 5/04 296/37.1 |
| 6,883,851 B2 | * | 4/2005 | McClure | B60R 13/01 224/42.2 |

(Continued)

FOREIGN PATENT DOCUMENTS

| | | |
|---|---|---|
| DE | 10 2009 053979 A1 | 6/2010 |
| DE | 10 2014 018315 A1 | 6/2015 |
| FR | 3 037 917 A1 | 12/2016 |

*Primary Examiner* — Pinel E Romain
(74) *Attorney, Agent, or Firm* — Osha Bergman Watanabe & Burton LLP

(57) ABSTRACT

A storage bin that is assembled at the rear of a motor vehicle includes a molded part made from polymer material defining, in the mounted position of the bin: an upper supporting rim, a bin bottom situated below the upper supporting rim, and one or more sidewall portions. The molded part further includes two oblique rims extending between the upper supporting rim and the bin bottom. The molded part is traversed by a lateral opening forming a notch from above, the notch being bordered by the two oblique or vertical rims. The lateral opening is closed by an attached wall assembled to the two oblique or vertical rims.

10 Claims, 2 Drawing Sheets

(56) References Cited

U.S. PATENT DOCUMENTS

| | | | | |
|---|---|---|---|---|
| 7,052,066 B2* | 5/2006 | Emery | ................... | B60R 11/06 |
| | | | | 296/37.1 |
| 7,488,024 B1* | 2/2009 | Medlar | ................... | B60R 5/04 |
| | | | | 296/37.14 |
| 7,931,324 B2* | 4/2011 | Henderson | ............... | B60R 5/00 |
| | | | | 296/37.1 |
| 8,281,967 B2* | 10/2012 | Evans | ...................... | B60R 9/00 |
| | | | | 224/404 |
| 9,168,874 B2* | 10/2015 | Smith | ...................... | B60R 9/00 |
| 2003/0011207 A1* | 1/2003 | Campbell | .......... | B62D 25/2054 |
| | | | | 296/37.6 |
| 2005/0194816 A1* | 9/2005 | Kiester | ................. | B62D 33/02 |
| | | | | 296/182.1 |
| 2007/0001473 A1* | 1/2007 | Eidsmore | ............. | B60P 1/6454 |
| | | | | 296/26.08 |
| 2007/0046056 A1* | 3/2007 | Delaney | ................ | B62D 33/02 |
| | | | | 296/37.6 |
| 2010/0225135 A1 | 9/2010 | Taneda | | |
| 2011/0227367 A1 | 9/2011 | Funakoshi | | |
| 2015/0251712 A1* | 9/2015 | Craven | ................... | B60R 7/04 |
| | | | | 296/37.2 |
| 2015/0329148 A1* | 11/2015 | Borowicz | ............... | B60N 2/04 |
| | | | | 180/291 |

* cited by examiner

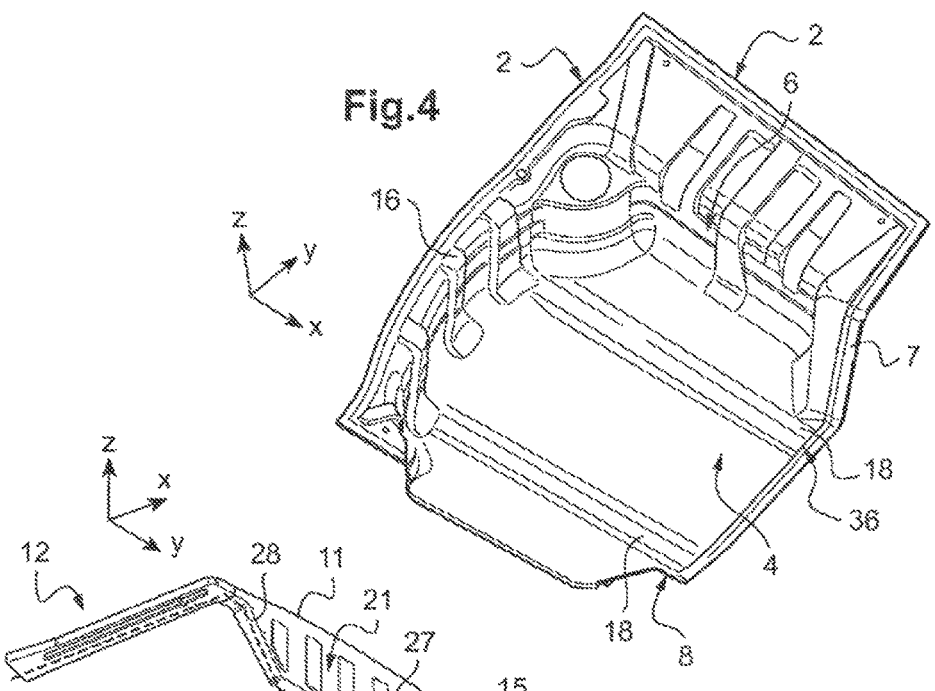
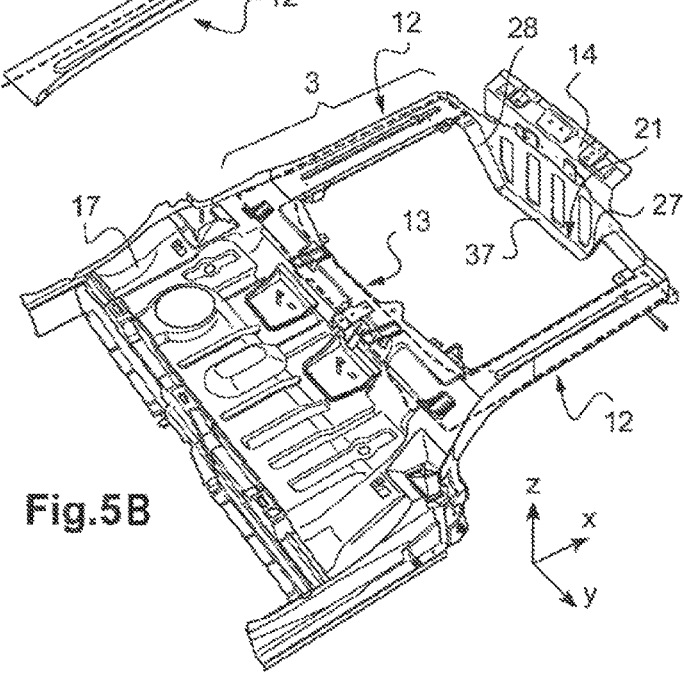

STORAGE BIN FOR ASSEMBLY ON A MOTOR VEHICLE BODY STRUCTURE

The invention relates to motor vehicle body structures, and more particularly the portions forming a storage bin incorporated into such structures. For example, a storage bin can be incorporated at the rear of a motor vehicle body structure so as to set aside a storage space intended for a spare wheel. The bin can typically be arranged below the vehicle rear floor level. Storage bins can also be arranged for example to store tools or emergency accessories for the vehicle. Generally, the aim is to minimize the ratio between the external footprint of the bin—or total footprint of the bin—and the footprint of the internal volume of the bin, by optimizing the shape of this volume as a function of the objects that the bin is to contain. To store a spare wheel, a storage bin can typically be made from pressed metal, the metal shell being welded to side members of the vehicle and to a floor covering a skid cross member transverse to the vehicle.

In order to reduce the weight of the vehicle, it can be desirable to replace the metal bin with an injected bin made from plastic. The change in material requires a complete redesign of the bin, whether for reasons of strength of the materials used, for geometric requirements linked to the method of shaping the materials, or depending on the assembly means used to install the bin on the vehicle and the moment when this assembly takes place.

A part forming a bin can undergo/not undergo a history of high-temperature heat or thermochemical treatment, depending on the moment of assembly of the bin on the body structure. For example, replacing a pressed metal bin with a bin made from a polymer matrix composite can be envisaged, SMC (sheet molding compound) polymer matrix composites for example being chosen. Such composites of the thermosetting family are capable of undergoing a temperature history that corresponds for example to a cataphoresis baking process. In addition, the aim is to minimize the rear overhang of the vehicle, which is not optimized with the bins and layouts known in the prior art.

The aim of the invention is to further reduce the weight of the vehicle, reduce production costs and reduce the rear overhang of the vehicle by proposing an embodiment of a spare wheel bin, using a part molded by injection of thermoplastic material to form the container of the bin. It must be possible to assemble the part injected in this way on the body structure during sheet metal assembly, therefore it must be capable of withstanding the high-temperature thermochemical treatments applied to the body in white during the painting process. It must also be possible to assemble the injected part on the body structure after the painting process. In this case, it will not withstand any high-temperature thermochemical treatments.

To this end, a storage bin is proposed that is intended to be assembled at the rear of a motor vehicle, the bin including a part made from molded plastic defining, in the mounted position of the bin:
- an upper bin-supporting rim defining a substantially planar assembly contour of the bin, the assembly contour being capable of being assembled on a support frame surrounding at least one portion of the bin,
- a bin bottom located below the upper supporting rim,
- one or more side wall portion(s) molded in one piece with the bin bottom and the upper supporting rim, and supporting the bin bottom relative to the upper supporting rim.

The molded part also includes two oblique rims and is traversed, between the upper supporting rim and the bottom, by a lateral opening bordered by the two oblique rims, the lateral opening forming a cut-out from above, the lateral opening being configured to be closed by a wall insert, the wall insert then being assembled on the two oblique rims.

Such an open bin design very advantageously makes it possible to obtain a vehicle having a short overhang, due to a vertical rear wall insert.

Preferably, the wall insert extends vertically from the bin bottom to the support frame.

According to a preferred embodiment, the wall insert is substantially vertical.

Advantageously, the wall insert closes the bin at the rear of the vehicle, and is arranged perpendicular to the normal direction of travel of the vehicle.

The footprint of the bin is thus limited, particularly in the front-rear direction of the vehicle.

The oblique or vertical rims preferably extend along an average line other than vertical, for example along a straight oblique assembly average line, or along a curved assembly average line.

The assembly average line of the oblique or vertical rim is preferably arranged obliquely.

Advantageously, the oblique rim forms a ruled surface generated by a substantially horizontal generatrix direction (i.e. inclined by a maximum of 20° relative to a horizontal plane). Thus, the assembly zone of the molded part and the wall insert on the oblique rim permits the satisfactory transfer of the weight of the molded part and the contents thereof to the wall insert.

Preferably, the lateral opening of the bin is designed to be oriented towards the rear of the vehicle.

The wall insert can be an inner rear-facing panel of the motor vehicle.

Advantageously, the wall insert is assembled on the molded part along the two oblique or vertical rims, and is also assembled on the molded part along a free edge of the bottom of the molded part.

Side wall portion is given to mean a wall portion contributing, together with the bottom of the bin, to the definition of the usable internal volume of the bin.

Preferably, each of the two oblique or vertical supporting rims meets the upper supporting rim of the bin at one end, and meets the bin bottom at another of the ends thereof.

Side wall portion supporting the bottom of the bin is given to mean that the side wall portion contributes to fixing the position of the bottom of the bin relative to the upper supporting rim, and contributes to transferring at least part of the load applied to the bottom of the bin to the upper supporting rim.

Substantially planar assembly contour is given to mean that this contour is assembled according to assembly points located in a plane, or located in a space between two close parallel planes (i.e. the distance of which between the two close parallel planes represents less than one third of the shortest distance between one of these parallel planes and the bottom of the bin).

Preferably, the assembly plane is horizontal. Variant embodiments can be envisaged in which the assembly plane is inclined.

Variant embodiments can be envisaged in which the upper rim is assembled along a succession of planes having a slight difference in level between them.

Variant embodiments can be envisaged in which the bin is assembled by a contour docking on oblique walls, or on vertical walls, of a support frame.

The support frame supporting the upper supporting rim of the bin can be an open frame, for example a three-sided frame. The frame can be defined by a cross member of the vehicle or a rear floor of the vehicle, and by two side members of the vehicle. The upper supporting rim can be designed to rest on an upper face of the cross member or on a rear floor portion held by the cross member. The upper supporting rim can be designed to rest on an upper face of each of the side members.

Advantageously, the wall insert is assembled on the support frame so as to complete the support frame to form a closed frame for supporting the bin.

Advantageously, the upper supporting rim of the molded part can be substantially horizontal, and in the molded part can be limited, towards the front of the vehicle and under the supporting rim, by at least one first side wall portion the inclination of which relative to the vertical remains less than 10°, advantageously less than 5°, preferably less than 1°.

The total footprint of the bin in the front-rear direction of the vehicle is thus limited. Due to the opening formed at the rear of the molded part, the ejection direction of the molded part can be different from the vertical direction of the assembled part: the ejection direction of the molded part can for example be inclined relative to the vertical direction of the assembled part, so as to increase the draft angle of the side wall portion located towards the front of the vehicle.

The molded part can include, on an outer face of a wall forming the bottom of the bin, longitudinal ridges capable of forming an aerodynamic fairing under the vehicle.

Longitudinal ridges is given to mean ridges extending in a longitudinal direction, so as to stiffen the bin bottom wall in bending under the effect of vertical forces generated for example by the spare wheel or by the luggage loads in the trunk. Here, the longitudinal direction is a direction perpendicular to the wall insert. It corresponds to the longitudinal direction of the vehicle once the bin is assembled on the vehicle.

These ridges can for example, once the bin is assembled on the vehicle, be continuously aligned in the longitudinal direction, with ridges of a fairing covering a lower portion of a body structure of the vehicle.

The molded part can include, incorporated into a wall forming the bottom of the bin, closed-section hollow channels, such as hollow channels obtained by gas-assisted injection or water-assisted injection.

These injection techniques are known and make it possible to hollow out the core of a "thick" rib in a plastic injection mold, by driving polymer that has not yet solidified out from the center of the rib using a gaseous or liquid fluid.

According to one embodiment, the outer longitudinal ridges of the bin can be obtained by forming such hollow channels.

According to another advantageous embodiment, the hollow channels can be formed in the bin bottom wall in the direction transverse to the vehicle, i.e. in a direction substantially parallel to the wall insert closing the lateral opening of the bin.

Longitudinal ridges perpendicular to the hollow channels can then be defined by an undulation, with a constant thickness, of a bottom wall of the bin, so as to define an aerodynamic profile of the outer face of the bin.

Preferably, the additional thickness traversed by the transverse hollow channels is arranged only towards the inside of the surface of the bottom of the bin, so as not to modify the aerodynamics of the outer face of the bottom of the bin.

The bin can include a bin bottom wall defining outer longitudinal ridges in the form of undulations of the bottom wall—forming longitudinal open-section hollow beam portion structures—and including closed-section hollow channels, substantially perpendicular to the longitudinal ridges, the protrusion relative to the bin bottom wall of which is only apparent from inside the bin.

On the side wall portions, the protrusions of the channels relative to the bin bottom wall can also be located towards the inside of the bin. According to other embodiments, at least part of the protrusion created by the hollow channels can be apparent on the outside of the bin on the bin side walls.

At least one hollow channel can extend both on the bin bottom and over the height of a side wall portion of the molded part, so as to form a reinforcing structure capable of transferring forces from the bottom of the bin to the upper supporting rim of the molded part.

According to a preferred embodiment, the hollow channel extends, as well as on the bottom, on two facing side wall portions of the molded part, one located on the right, the other located on the left of the vehicle.

Two hollow channels can be arranged so as to form two reinforcing braces separated from each other on the upper supporting rim, and closer to each other towards a central portion of the bottom of the bin, in order to reinforce for example the spare wheel fixing zone for a bin intended to receive a spare wheel.

Advantageously, the bin bottom can be cross-hatched with a network of slat-type ribs, including a first group of ribs and a second group of ribs perpendicular to the first. Slat-type rib is given to mean a rib obtained by scoring the surface of the mold with a substantially planar groove, perpendicular to the surface of the mold used for injecting the molded part.

Advantageously, the height of the ribs is designed so that the height of the ribs compensates for the differences in depth of the bin bottom linked to the presence of the outer longitudinal ridges and/or compensates for the differences in depth linked to the presence of the hollow channels on the inner face of the bottom of the bin.

At least one hollow channel can extend between two bearing zones distant from each other, located on the upper supporting rim of the molded part, the hollow channel also running along a portion of the bin bottom, so as to form a reinforcing structure capable of transferring forces from the bottom of the bin towards the upper supporting rim of the molded part. According to a preferred embodiment, the channel can extend on the supporting rim, over a sufficient width of the supporting rim, so that the portion along which the channel runs rests on the support frame.

Advantageously, on the supporting rim, the channel is substantially perpendicular to a free edge of the supporting rim.

Preferably, at least two substantially vertical portions of the channel, connecting the bottom portion of the channel and the ends of the channel incorporated into the supporting rim, run along the side wall portion or portions (substantially vertical portion of the channel is given to mean that an average line of the channel is in a vertical plane intercepting the molded part. The channel then follows a line of greatest slope of the side wall portion.)

According to an advantageous embodiment, a grid of reinforcing ribs forming intersecting slats runs across the inner face of a bottom wall of the bin.

This grid of "conventional" ribs can in practice define a new bin bottom bearing plane, above the hollows linked to the presence of longitudinal ridges, and between the hollow channels reinforcing the bin on the inner face thereof.

The grid of ribs, in addition to its role as a mechanical reinforcement, can make it possible to limit the vibration noise of the bin, by preventing or limiting certain vibration modes.

Advantageously, the bin can include a molded part the lateral opening of which is bordered by an assembly strip, the assembly strip forming an enclosed ruled surface, with horizontal generatrices. This assembly strip can for example serve as a gluing line. The bin can also include a wall insert, assembled by gluing to the molded part, under the enclosed ruled surface.

Here, ruled surface is given to mean a ruled surface in the broad sense. Here, the horizontal generatrices of the ruled surface can thus be resting on a trapezoidal curve.

Advantageously, a portion of the cylindrical assembly strip runs along the bin bottom wall.

A method for manufacturing a vehicle including a storage bin at a front or rear end of the vehicle is also proposed, the method including the steps of:

providing a support structure forming a U-shaped horizontal frame, defined by three perpendicular sides forming the U, and open on a front or rear end of the vehicle, providing a substantially vertical wall insert, with a trapezoidal supporting rim, perpendicular to the general plane of the wall and forming a trapezoidal contour flared towards the top—the trapezoidal supporting rim can advantageously meet an upper face of the U-shaped frame from underneath, assembling the wall insert so as to complete the open U-shaped frame to form a frame closed by the wall insert on the side of the end of the vehicle towards which the U was open, providing a molded part forming a bin, including a bin bottom, including an upper supporting rim capable of resting on the U-shaped frame, and including an assembly rim complementary to the trapezoidal supporting rim of the wall insert, using a gluing line running along the U-shaped frame and under the upper supporting rim of the part, and running along the trapezoidal supporting rim of the wall insert, gluing the molded part to the frame provided by the support structure and by the wall insert.

A number of aims, features and advantages of the invention will become apparent on reading the following description, given solely as a non-limitative example and with reference to the attached drawings, in which:

FIG. 4 is a bottom perspective view of the molded part in FIG. 3;

FIG. 5A is a perspective diagrammatical representation of the path of a gluing line used to assemble the molded part in FIGS. 3 and 4 on a suitable body structure;

FIG. 5B is a perspective diagrammatical representation of an automobile body structure portion capable of receiving the molded part in FIGS. 3 and 4, by assembling this molded part along the gluing line shown in FIG. 5A.

Figure 1:
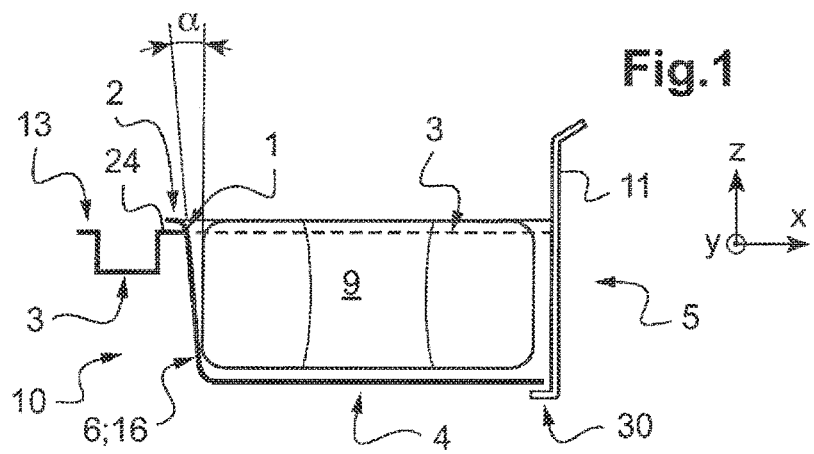
FIG. 1 is a cross-sectional schematic diagram along a longitudinal mid-plane of the vehicle, of a spare wheel storage bin according to the invention, showing a molded part profile defining the internal volume of the bin.

FIG. 1 shows, in a coordinate system linked to a vehicle, and identified by the axes x, y and z, a spare wheel bin 10, sized to receive a spare wheel 9. The internal volume of the bin is defined by a part 1 made from molded thermoplastic material. The x axis represents a longitudinal horizontal axis of the vehicle from the front to the rear of the vehicle, along the usual direction of travel of the vehicle. The y axis denotes a horizontal axis transverse to the vehicle. The z axis is an upwards vertical axis.

As shown in FIG. 1, the molded part 1 includes a bin bottom wall 4 supporting the spare wheel 9. The molded part 1 also includes a substantially horizontal upper supporting rim 2, resting on a frame 3 formed by one or more cross members of the vehicle, as well as by side members of the vehicle.

For example, a skid cross member 13 can be seen in FIG. 1. A horizontal portion 24 of the upper supporting rim 2 of the molded part 1, extending transverse to the vehicle, rests on a floor covering an upper face of the skid cross member 13. The skid cross member 13 is connected, on the right and left of the vehicle, to side members 12 not shown in FIGS. 1 and 2 (but shown for example in FIG. 5B).

The skid cross member 13, the floor covering the cross member, and the side members 12 together form a support frame 3 supporting the bin on at least three sides, on its upper supporting rim 2. This frame 3 is a U-shaped frame, in that it includes three sides. On the open side of the U, i.e. towards the rear of the vehicle, the frame 3 is connected to a wall insert 11, referred to here as the inner rear-facing panel.

The wall insert 11, substantially vertical, extends transverse to the vehicle. The bottom wall 4 supporting the objects to be stored, here the spare wheel, is connected to the upper supporting rim 2 by one or more side wall portions 6, particularly by a first side wall portion 16 located at the front of the bin. These side wall portions 6 of the molded part 1 connect the bin bottom 4 and the upper supporting rim 2, so as to define lateral edges (including the front edge 24) of the molded part 1.

At the rear of the vehicle, the molded part 1 has a lateral opening 5, in the form of a cut-out from above, cutting into the side wall portions 6. The lateral opening 5 includes oblique or vertical assembly edges (or rims) 7, 8, not shown in FIGS. 1 and 2 but shown for example in FIG. 3. These oblique edges 7, 8 are configured so that they can be assembled with the wall insert 11.

An assembly average line on these edges 7, 8 is located in a vertical plane so as to be able to dock on the wall insert 11, which includes to this end corresponding oblique rims 27, 28 configured to be positioned respectively under the edges 7, 8 and supporting them. To this end, the edges 7, 8, 27, 28 extend in planes including a horizontal component. This horizontal component is substantially perpendicular to the vertical mid-plane of the wall insert 11.

As shown in FIG. 1, this configuration with the molded part open towards the rear of the vehicle enables good front-rear compactness of the bin.

The bin 10 is bordered to the rear by a vertical wall corresponding to the wall insert 11. The bin is bordered to the front by the upper supporting rim 2 placed on top of the frame 3, as well as by the first side wall portion 16 located at the front of the bin, and the footprint of which is a function of the angle α of this wall 16 relative to the vertical z. The angle α can typically correspond to an angle of 0.5 to 1° if the part 1 is demolded in a direction perpendicular to the bottom wall 4 of the bin. The front-rear footprint of the bin 10 can be reduced further by making the angle α closer to zero, for example by designing the mold to demold the part 1 in a direction slightly inclined relative to the normal to the bottom 4 of the molded part. The injection mold of the part 1 can be designed to this end, due to the opening 5 located at the rear of the molded part 1.

Figure 2:
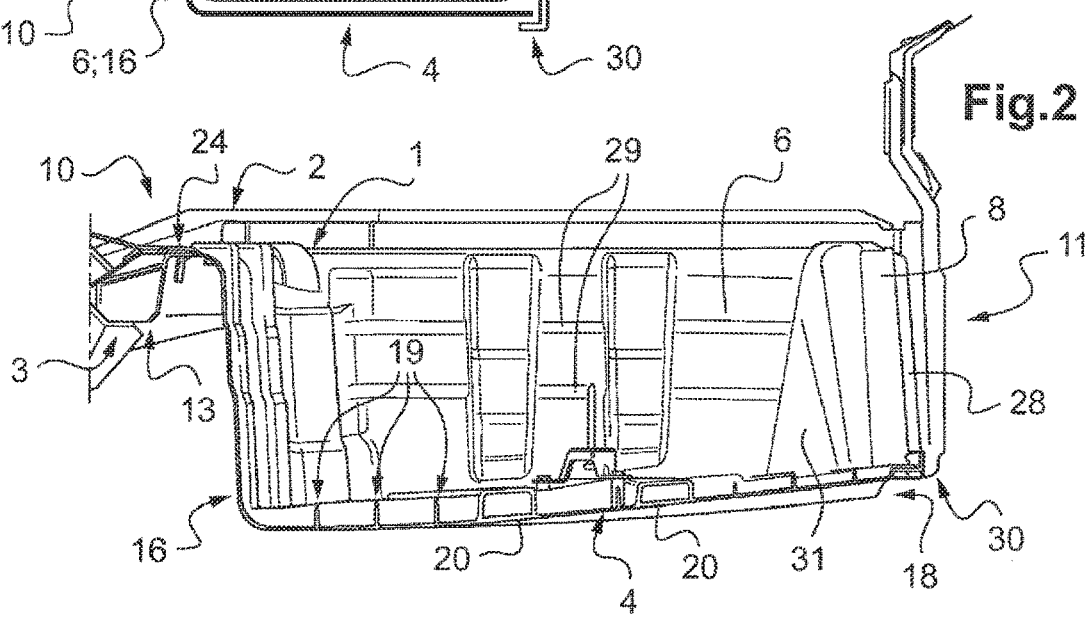
FIG. 2 is a cross-sectional profile, along the same cutting plane, of a spare wheel storage bin corresponding to the schematic shown in FIG. 1.

FIG. 2 shows several additional details of the profile of the molded part 1. FIG. 2 contains elements in common with FIG. 1, with the same elements being denoted by the same reference signs. Stiffening elements of the molded part 1 will be noted in particular in FIG. 2, visible on the cross-section of the bottom wall 4 of the bin.

Figure 3:
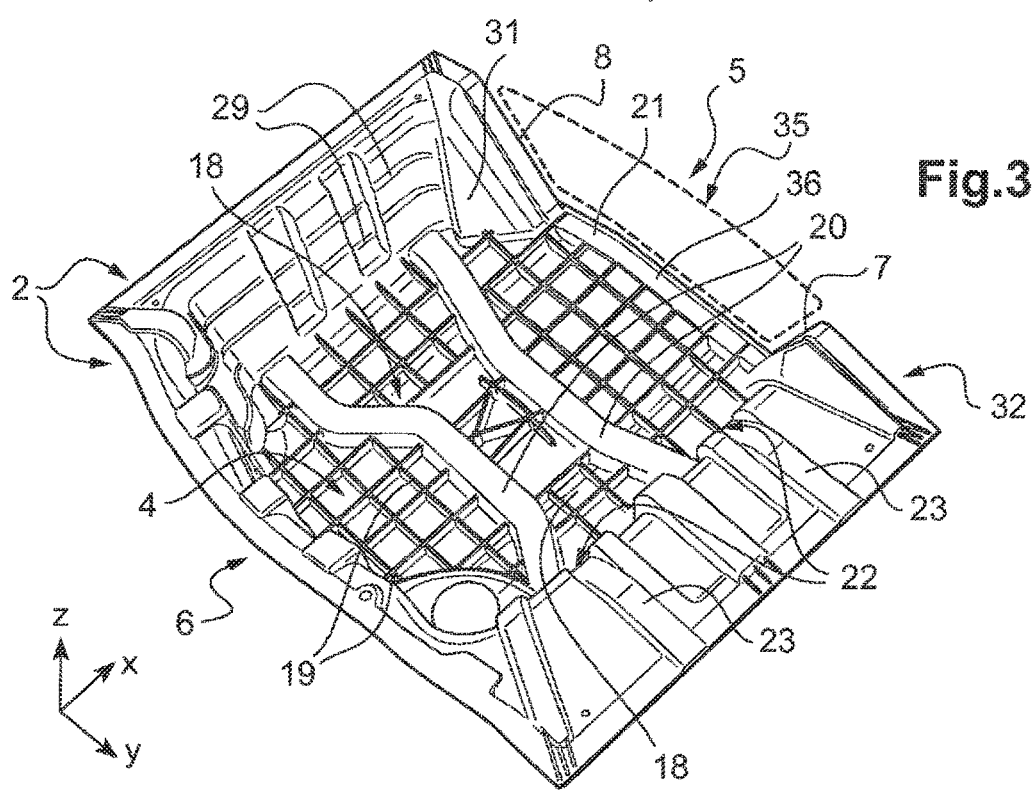
FIG. 3 is a perspective view, seen from the top of the bin, of a molded part forming the bin shown in FIG. 2.

The bottom of the bin is stiffened by the presence of planar stiffening ribs 19, seen here in cross-section, but that form a grid on the surface of the bottom of the bin, as shown in FIG. 3, so as to form a three-dimensional structure. This three-dimensional structure prevents in particular "drum skin" type vibrations on the bottom of the bin.

Some of the walls of the molded part 1 are also stiffened by hollow channels 20, acting mechanically as closed-section hollow beam portions. These channels 20 can be obtained by gas-assisted injection methods or water-assisted injection methods. These injection methods are known per se. Here, the bottom 4 of the molded part, and some of the side walls, are thus stiffened by hollow channels.

In some embodiments, planar ribs can extend up one or more side wall portions of the bin. In the examples shown, the side walls are not provided with such ribs.

In the embodiment shown, the hollow channels 20 extend up the side walls 6 so as to 'hook' each of the hollow beams 20 onto the upper supporting rim 2. The hollow beam structure then benefits from the support of the frame 3, which is generally a metal structure supporting the upper supporting rim 2.

In addition, as shown in FIG. 2, the side walls 6 are stiffened in bending about a vertical axis by a profile of the walls forming undulations 29. Here, the undulations 29 form a horizontal pattern on these side walls 6.

A substantially triangular wall portion 31, connecting one of the oblique rims 8 for rear assembly of the part 1 and a side wall portion 6, and bordering one of the lateral sides—here the right-hand side—of the bin 10, will also be noted in FIG. 2. Here, the side wall 6 is substantially planar as opposed to a cylindrical or conical side wall portion that could surround the wheel 9 and define an oblique edge 8 without any transition between side wall portions and rear wall portion. These embodiments can also be envisaged within the scope of the invention.

Planar stiffening ribs 19, the hollow channels 20, the protrusions formed by these transverse channels 20 extending up the side walls 6 of the molded part 1, and the undulations 29 for stiffening the side walls 6, can all be seen in FIGS. 2, 3.

Undulations of the bottom 4 of the molded part 1 can also be made out in FIGS. 2, 3, in the longitudinal direction of the vehicle, so as to form the aerodynamic longitudinal ridges 18.

These aerodynamic outer ridges can be seen more clearly in FIG. 4.

FIGS. 3 and 4 provide a clearer understanding of the different ridges and the stiffening structures of the bin bottom wall 4, as well as the side walls 6 of the bin. FIGS. 3 and 4 contain elements in common with the previous figures, with the same elements being denoted by the same reference signs.

In the example shown in FIGS. 2, 3, the height of the planar ribs 19 is comparable to the height of the aerodynamic longitudinal ridges 18, but variant embodiments can be envisaged in which the planar ribs 19 form a substantially higher/deeper network (in the vertical direction z) than the depth of the undulations 18. The height of the ribs 19 can vary as a function of the ridges 4 of the bottom of the bin. The height of the ribs 19 can vary between the front and the rear of the bin.

An oblique rim 28 of the wall insert 11, configured to support the oblique rim 8 of the molded part, can be seen in FIG. 2. By means of the oblique rims 7, 8, 27, 28, part of the weight of the molded part 1 and the contents thereof can be transferred to the wall insert 11 by vertical support, instead of being transferred by shear as would be the case for an assembly by portions with vertical surfaces.

It will also be noted that the wall insert 11 includes a horizontal lower assembly rim 30, which is inserted under a horizontal rim portion of the bottom 4 of the bin.

To return to FIGS. 3, 4, it will be noted that the transverse hollow channels 20 contributing to the stiffening of the bin, with a view to placing a part to be transported in the center of the bin, are not only formed so as to hook the hollow channels onto the upper rim 2 of the bin, but their average line is also formed so as to bring the two channels closer together at the bottom of the bin, towards the center of the surface of the bottom 4 of the molded part 1. Each of the channels thus passes underneath the spare wheel that the bottom 4 of the bin is to support.

In the vicinity of the side walls 6, the channels 20 conversely move away from each other so as to better distribute the load of the wheel on the contour of the upper supporting rim 2.

The generally flared shape of the molded part 1 towards the top will be noted, forming a bin one side of which is opened by a trapezoidal cut-out descending to the bottom 4 of the bin. The cut-out is also flared towards the top. The cut-out defines an opening 5 between the bottom 4 of the bin, and a fictitious line 35 that would complete an upper contour of the bin level with the supporting rim 2 to form a closed contour.

FIG. 5A shows a trajectory in space of a gluing line 15 making it possible to secure the molded part 1 (not shown in FIG. 5A) to the side members 12, to the wall insert 11, and to the floor covering the skid cross member 13 (skid cross member not shown in FIG. 5A). FIG. 5A contains some elements in common with the previous figures, with the same elements being denoted by the same reference signs.

The oblique rim portions 27 and 28 intended to receive the first oblique rim 7 and the second oblique rim 8 respectively of the molded part 1 will in particular be noted on the wall insert 11.

The gluing line 15 forms a closed curve, running along the upper supporting rim 2 of the molded part 1, running along the first oblique rim 7 and the second oblique rim 8 of the molded part, and running along a portion of a horizontal rim 36 of the bin bottom wall 4 of the molded part 1, bordering the lower part of the opening 5 and configured to rest on an edge 37 of the wall insert 11.

Reference sign 21 in FIG. 5A denotes, on the wall insert 11, an assembly strip portion including the assembly edges (or rims) 27, 28, 37; this assembly strip portion can be described as a ruled surface, as horizontal generatrices parallel to the x axis can travel along this assembly strip portion. This ruled assembly surface in fact forms a short rebate, with a trapezoidal contour, enclosed to rest on a complementary trapezoidal edge of the wall insert 11.

In some embodiments, a horizontal rim portion can also be made on the wall insert 11 to support the right and left rims of the upper supporting rim 2 of the molded part 1.

FIG. 5B shows the support structure on which the molded part 1 is assembled (molded part 1 not shown in FIG. 5B).

FIG. 5B contains elements in common with some of the previous figures, with the same elements being denoted by the same reference signs. FIG. 5B shows, in the same x, y, z coordinate system linked to the vehicle, the side members 12 of the vehicle, each supporting a right and left portion of the upper supporting rim 2 of the molded part 1, and the location of the skid cross member 13 transverse to the vehicle and supporting at the rear of the vehicle, a rear floor portion 17.

Together the two side members 12 and the skid cross member 13 form a U-shaped upper support frame 3, i.e. an open frame, said frame being configured to support at least one portion of the upper supporting rim 2 of the molded part 1.

An inner rear-facing panel 14 in two parts includes on its lower part the wall insert portion 11 configured to close the spare wheel bin at the rear.

The molded part 1 can thus be assembled on the two side members 12, on the skid cross member 13—or on the rear floor portion 17—and on the wall insert 11 so as to be supported vertically on the docking zones of the molded part 1 on the support structure.

By way of illustration, the thickness of the molded part can be between 1.5 mm and 6 mm, for example between 2 mm and 4 mm.

The transverse cross-section of a channel 20 (including walls) can have dimensions in the order of 30 to 40 mm in the plane of the wall, for example 40 mm, and a height of 15-30 mm perpendicular to the bottom wall or the side wall, for example a height of 20 to 25 mm.

The thickness of the polymer on the walls of the channel can be greater than the thickness of the bottom 4 or the side wall 6, for example up to two times greater: the thickness of the channel wall can for example be between 4 and 6 mm.

The invention is not limited to the embodiments described, and can be produced in a number of variants. The different side wall portions 6 of the molded part 1 can describe a bin with a rounded contour instead of forming a bin with a substantially rectangular contour. The inclination of the rims 7, 8 can facilitate the demolding of the part. The bin bottom wall 4 can be reinforced by planar ribs only. The bin bottom wall can, in another embodiment, be reinforced by hollow channels forming hollow beams only. The side wall portions 6 can be reinforced by undulations only, reinforced by hollow channels only, or not be reinforced and form substantially smooth walls.

The molded part 1 can be assembled according to techniques other than assembly by gluing. For example, the assembly of the upper rim 2 by welding metal pellets incorporated into the upper supporting rim 2 of the molded part 1 onto the metal frame 3 can be envisaged.

According to one variant, the channels can ascend vertically from the bottom on one side wall only.

According to one variant, the channels can ascend asymmetrically on the side walls of the bin, as a function of the space constraints in the bin and outside the bin.

According to one variant, the channels can be contiguous and communicate in a central part of the bottom of the bin for example.

The molded part 1 according to the invention is designed so as to optimize the stiffness of the part relative to the weight of material used, so as to incorporate the functions of aerodynamic fairing outside the vehicle, and so as to limit the total footprint of the bin, particularly along the front-rear direction of the vehicle.

The weight of the vehicle is thus reduced and the production costs are optimized.

The storage bin according to the invention makes it possible to set aside an optimized storage space at the rear of the vehicle. The use of a large part made from molded thermoplastic material makes it possible to reduce the overall weight of the vehicle. The design proposed for the part makes it possible to obtain a good compromise between the stiffness of the part, the internal volume of the bin and the external footprint of the bin, while complying with the production and assembly constraints of the molded part.

The invention claimed is:

1. A storage bin intended to be assembled at a rear of a motor vehicle, the bin comprising a molded part made from polymer material defining, in a mounted position of the bin:
   an upper supporting rim defining a substantially planar assembly contour of the bin, the assembly contour being assembled on a support frame surrounding at least one portion of the bin,
   a bin bottom located below the upper supporting rim,
   at least one side wall portion molded in one piece with the bin bottom and the upper supporting rim, and supporting the bin bottom relative to the upper supporting rim,
   wherein the molded part also comprises two oblique rims extending between the upper supporting rim and the bottom, and the molded part is traversed by a lateral opening forming a cut-out from above, the cut-out being bordered by the two oblique rims, the lateral opening being closed by a wall insert assembled on the two oblique rims.

2. The bin as claimed in claim 1, wherein the upper supporting rim of the molded part is substantially horizontal, and wherein the molded part is limited, towards a front of the vehicle and under the supporting rim, by at least one first side wall portion wherein the inclination of the at least one first side wall portion relative to the vertical remains below 10°.

3. The bin as claimed in claim 1, wherein the molded part includes, on an outer face of a wall forming the bin bottom, longitudinal ridges that form an aerodynamic fairing under the vehicle.

4. The bin as claimed in claim 1, wherein the molded part includes, incorporated into a wall forming the bin bottom of the bin, closed-section hollow channels.

5. The bin as claimed in claim 3, including a bin bottom wall defining outer longitudinal ridges in the form of undulations of the bottom wall, and including closed-section hollow channels, substantially perpendicular to the longitudinal ridges, the protrusion of the hollow channels relative to the bin bottom wall only being apparent on the inside of the bin.

6. The bin as claimed in claim 4, wherein at least one hollow channel extends both on the bin bottom and over a height of a side wall portion of the molded part, so as to form a reinforcing structure that transfers forces from the bin bottom to the upper supporting rim of the molded part.

7. The bin as claimed in claim 4, wherein at least one hollow channel extends between two supporting zones, at a distance from each other, located on the upper supporting rim of the molded part, the hollow channel also running along a portion of the bin bottom.

8. The bin as claimed in claim 7, wherein two hollow channels form two reinforcing braces laterally separated from each other on the upper supporting rim, and closer to each other towards a central portion of the bin bottom.

9. The bin as claimed in claim 1, comprising a molded part wherein the lateral opening of the molded part is bordered by an assembly strip, forming an enclosed ruled surface, with horizontal generatrices, the bin also resting on a wall insert, assembled by gluing to the molded part, under the enclosed cylindrical surface, a complementary assembly strip defined on the wall insert.

10. A method for manufacturing a vehicle comprising a storage bin at a front end or a rear end of the vehicle, comprising:

providing a support structure forming a U-shaped horizontal frame, defined by three perpendicular sides forming the U, the frame being open on the front end or the rear end of the vehicle, providing a substantially vertical wall insert, with a trapezoidal supporting rim, perpendicular to the wall and forming a trapezoidal contour flared towards the top, assembling the wall insert so as to complete the open U-shaped frame to form a frame closed by the wall, providing a molded part forming a bin, comprising a bin bottom, comprising an upper supporting rim that rests on the U-shaped frame, and comprising an assembly rim complementary to the trapezoidal supporting rim of the wall insert, using a gluing line running along the U-shaped frame and under the upper supporting rim of the molded part, and running along the trapezoidal supporting rim of the wall insert, gluing the molded part to the frame provided by the support structure and by the wall insert.

* * * * *